United States Patent [19]

Cloup

[11] 4,029,427
[45] June 14, 1977

[54] APPARATUS FOR POSITIONING TOOLS

[76] Inventor: Jean Cloup, 33360 Latresne, France

[22] Filed: Nov. 11, 1975

[21] Appl. No.: 631,159

[30] Foreign Application Priority Data

Dec. 24, 1974 France .............................. 74.42695

[52] U.S. Cl. .................... 408/3; 83/553; 83/560
[51] Int. Cl.² ........................................ B23B 29/08
[58] Field of Search ................ 408/3; 83/553, 560; 91/367, 368

[56] References Cited

UNITED STATES PATENTS

| 3,238,621 | 3/1966 | Bullard | 91/368 |
| 3,712,161 | 1/1973 | Valente | 83/560 |

Primary Examiner—Gil Weidenfeld
Attorney, Agent, or Firm—Marn & Jangarathis

[57] ABSTRACT

Apparatus for positioning a machine tool in relation to a workpiece comprises a support for the tool actuated by a fluid ram, with a control member carried by the support on a parallelogram linkage and arranged to operate a servo-valve associated with the ram. The controller is actuated at selected positions by a selected one of a number of pre-selector members adjustably located on a reference member which also engages the work. Each pre-selector member has an extendable roller controlled by a small fluid ram and when the roller runs off the end of the control member the ram stops and the machine tool is then in position.

8 Claims, 3 Drawing Figures

APPARATUS FOR POSITIONING TOOLS

The present invention is concerned with apparatus for positioning a movable member such as a tool in relation to a workpiece.

In working on any workpiece by means of a tool it is necessary to determine the position of the latter with reference to the workpiece, which may be assumed to be fixed.

Such an arrangement can be used particularly for piercing or stamping a shaped part in which holes have to be formed in several positions, without resorting to sequential arrangements nor complicated logic systems.

The positioning arrangement according to the invention is very simple and only comprises mechanical means and fluid operated elements of a very simple nature.

The invention consists broadly in a support for the movable member which is mounted to slide on a guide parallel to the workpiece, the said support member having an arm on which is mounted by means of two parallel pivoted links a controller, arranged to co-operate with an assembly of pre-selector members selectively controlled and mounted to slide on a reference bar, the said arm of the support member carrying a detector connected to the controller and arranged to control the said member.

Figure 1:
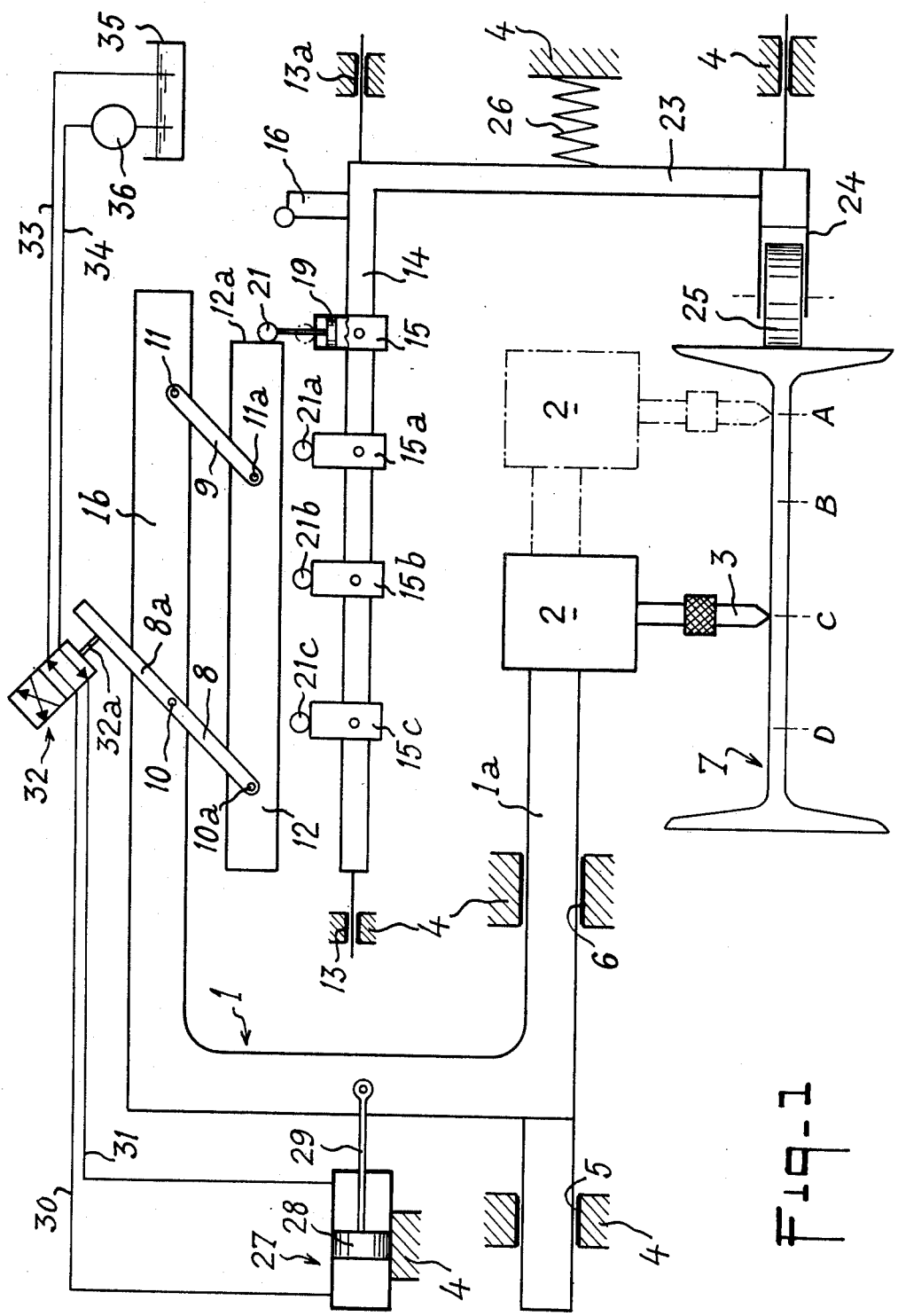
Figure 2:
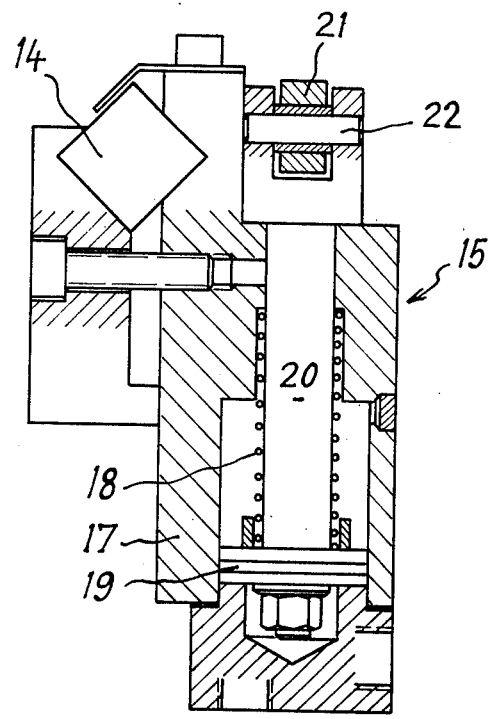
Figure 3:
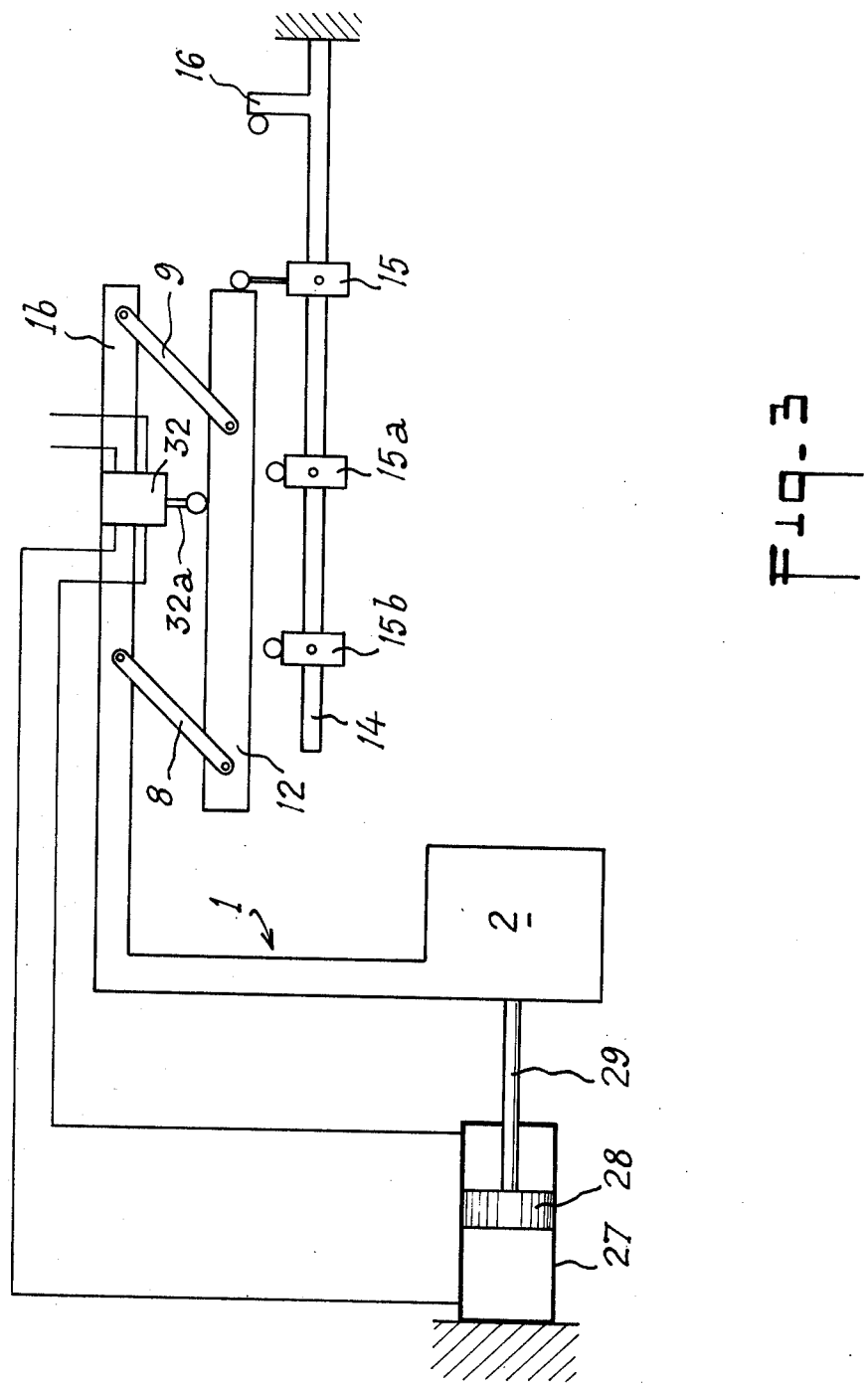

Other characteristics and advantages of the invention will be better understood from a reading of the following description of several examples of performing the invention made with reference to the accompanying drawings in which:

FIG. 1 is a schematic view of one method of constructing positioning apparatus according to the invention, FIG. 2 is a sectional view of a detector member, and FIG. 3 is a schematic view of another method of constructing the positioning apparatus.

In FIG. 1 is shown a positioning apparatus according to the invention comprising a support member 1 having an arm 1a on the end of which is fixed a machine tool 2 such as a drilling machine or punching machine carrying a tool 3.

The support member 1 is mounted to slide in bearings 5 and 6 carried by a frame 4 illustrated diagrammatically, the said support member 1 being arranged to move parallel with a workpiece 7 such as a shaped rail.

The support member 1 also has an arm 1b on which is mounted a controller 12 by means of two parallel links 8,9 pivoted at 10,10a and 11,11a. The arm 1b of the support member 1, the two links 8 and 9, and the controller 12 form a parallelogram linkage.

Parallel with the conroller 12 is a reference bar 14 mounted in bearings 13,13a carried by a frame 4. A plurality of pre-selector members 15 to 15C are arranged to slide on the bar 14, the said bar carrying at one of its ends a stop member 16.

In FIG. 2 is shown in detail a detector member which comprises a cylinder 17 in which is mounted to slide a piston 19 subject to the pressure of a control fluid against the action of a spring 18, the said piston 19 being provided with a rod 20 sliding in the cylinder 17 and carrying at its end a roller 21 mounted to rotate on a pin 22. The rollers 21 to 21c co-operate with the controller 12 when one of the members 15 to 15c is energised by admission of fluid into the cylinder 17.

The bar 14 is rigidly connected by a limb 23 to a reference member 24 provided with a roller 25 arranged to engage with one of the ends of the workpiece 7 under the action of at least one spring member 26 bearing on a part of the frame 4.

The movement of the support member 1 is achieved by a double acting ram 27 fixed on the frame 4 and having a piston 28 connected by a rod 29 to the support member 1. The two chambers of the ram defined by the piston 28 are connected by conduits 30,31 to a servo-valve 32 fixed to the arm 1b and having a control element 32a in contact with an extension 8a of the link 8.

This arrangement provides for control of the servo-valve 32 according to the position of the controller 12, and in the example of FIG. 3 the control member 32a of the servo-valve is in contact with the controller 12.

The servo-valve 32 is connected on the other side by conduits 33,34 to a tank 35, and a pump 36, the arrangement being such that depending on the position of the servo-valve 32 to two chambers of the ram 27 are connected alternatively to the source of pressure fluid 36 or the tank 35 so as to displace the piston 28 and the support 1 in one direction or the other, and thus also the tool 3 with reference to the workpiece 7.

The above described arrangement according to the invention functions in the following manner.

Initially the workpiece 7 is in a fixed position as shown in FIG. 1 and the reference member 24 is located by the roller 25 engaging against the workpiece 7. The support 1 carrying the controller 12 is in a certain position and the pre-selector members 15 to 15c are in their de-energised positions, the rollers 21 to 21a being in their withdrawn positions under the action of the springs 18 as shown in FIG. 2.

To bring the tool 3 opposite position A and to carry out, for example, a drilling or piercing operation the cylinder 17 of a pre-selector member 15 is pressurised with fluid to cause displacement of its piston 19 against the spring 18, so that the respective roller comes in contact with the controller 12 and causes its displacemtn, and hence the links 8 and 9. The extension of the link 8a comes in contact with the control member 32a of the servo-valve 32 and this causes one of the chambers of the ram 27 to be filled with pressure fluid at the same time as the other chamber is relieved to the tank 35 so as to cause the simultaneous displacement of the support member for the tool 3 and the controller 12.

As soon as the roller 21 reaches the extremity 12a of the controller 12, as is shown in FIG. 1, the controller 12 through the extension 8a of the link 8 acts on the servo-valve 32 and stops the flow of fluid to the ram 27, and consequently stops the support member 1 with the tool 3 opposite position A.

When the manufacturing operation is finished the fluid pressure supply to the pre-selector member 15 is shut off, so that the roller 21 returns to its withdrawn position, under the action of the spring 18, and the controller 12 returns to a position of readiness. It is sufficient then to act on another detector member 15b to energise the controller 12 and the servo-valve 32 and bring the tool 3 in the same manner opposite position C as shown in full lines in FIG. 1.

By comparison in the example of FIG. 3 the controller 14, on which the pre-selector chambers 15 to 15b are adjustably mounted, is fixed. Moreover the servo-valve 32 is actuated directly by the controller 12, the control member 32a of the servo-valve being directly in contact with the controller 12.

It will be understood that many different modifications of the arrangements or processes described above solely by way of non-limiting examples, can be designed without departing from the scope of the invention.

I claim:

1. An apparatus for positioning a tool member in relationship to a workpiece which comprises:
   guide means positioned in said apparatus;
   a support member slidably mounted in said guide means and including said tool member disposed for movement in a parallel relationship to said workpiece; a controller member being supported for displacement from a normal position,
   an actuator device mounted on said apparatus and operatively connected to said controller member for moving said support member relative to said workpiece upon said controller member being displaced from said normal position; and
   a reference bar for determining the position of said workpiece, at least one pre-selector means mounted on said reference bar; and said pre-selector means being operative to displace said controller member from said normal position for effecting selective positioning of said tool with reference to said workpiece.

2. The apparatus according to claim 1, wherein said controller member is mounted on said support member by means of a pair of parallel pivotable links.

3. The apparatus according to claim 2, in which the said support member and said controller form a parallelogram linkage with said pair of pivotable links.

4. The apparatus according to claim 1 in which said pre-selector means is comprised of a servo-valve actuated by said controller member for controlling the admission of fluid to said actuator device including a fluid-operated ram connected to said support member.

5. The apparatus according to claim 4, in which said servo-valve includes an operating element for engaging said controller member.

6. The apparatus according to claim 1, in which said pre-selector means are comprised of a fluid operated ram connected to a roller which co-operates with an end of said controller member.

7. The apparatus according to claim 1, in which said reference bar is slidably mounted in guides means and wherein said reference bar is arranged to engage said workpiece under the action of a spring.

8. The apparatus according to claim 1, including an abutment mounted on said reference bar.

* * * * *